United States Patent
Wang (10) Patent No.: US 10,129,603 B2
(45) Date of Patent: Nov. 13, 2018

(54) VIEWING RECORD PROCESSING CIRCUIT AND ASSOCIATED METHOD

(71) Applicant: MStar Semiconductor, Inc., Hsinchu Hsien (TW)

(72) Inventor: Sung-Wen Wang, Zhubei (TW)

(73) Assignee: MSTAR SEMICONDUCTOR, INC., Hsinchu Hsien ( * ) Notice: Subject to any disclaimer, the term of this patent is extended or adjusted under 35 U.S.C. 154(b) by 0 days.

(21) Appl. No.: 15/450,515

(22) Filed: Mar. 6, 2017

(65) Prior Publication Data

US 2017/0280194 A1    Sep. 28, 2017

(30) Foreign Application Priority Data

Mar. 22, 2016   (TW) .............................. 105108858 A (51) Int. Cl.

| H04H 60/32 | (2008.01) |
|---|---|
| H04H 60/33 | (2008.01) |
| H04N 21/658 | (2011.01) |
| G06F 17/30 | (2006.01) |
| H04N 21/442 | (2011.01) |
| H04N 21/4335 | (2011.01) |
| H04N 21/41 | (2011.01) |
| H04L 29/08 | (2006.01) |

(52) U.S. Cl.
CPC ..... *H04N 21/6582* (2013.01); *G06F 17/3005* (2013.01); *H04N 21/4335* (2013.01); *H04N 21/44222* (2013.01); *G06F 17/30843* (2013.01); *H04H 60/33* (2013.01); *H04L 29/08675* (2013.01); *H04N 21/4131* (2013.01)

(58) Field of Classification Search
None
See application file for complete search history.

(56) References Cited

U.S. PATENT DOCUMENTS

| 2006/0277197 | A1* | 12/2006 | Bailey | ................ G06F 17/3089 |
| 2013/0086159 | A1* | 4/2013 | Gharachorloo | ........ G06Q 50/01 |
| | | | | 709/204 |
| 2014/0149499 | A1* | 5/2014 | Pointon | ............... H04L 67/2828 |
| | | | | 709/204 |
| 2016/0336962 | A1* | 11/2016 | Henry | ................. H03M 7/3086 |

FOREIGN PATENT DOCUMENTS

| CN | 101072309 | 11/2007 |
| CN | 101783923 | 7/2010 |
| TW | 579654 | 3/2004 |

* cited by examiner

*Primary Examiner* — James R Marandi
(74) *Attorney, Agent, or Firm* — WPAT, PC (57) ABSTRACT

A viewing record processing circuit includes: a sensor, receiving a remote control signal; a decoder, decoding the remote control signal to a digital command code; an instruction module, generating a plurality of channel selection instructions according to the digital command code; a viewing list generating module, generating a viewing list according to the channel selection instructions, the viewing list including multiple viewing records; a sorting module, sorting the multiple viewing records in the viewing list to generate a sorted viewing list; and a compression module, compressing the sorted viewing list to generate a compressed viewing list.

18 Claims, 5 Drawing Sheets

| | C1 | C2 | C3 |
|---|---|---|---|
| R01 | 2015/11/24 | 19:50 | CTS |
| R02 | 2015/11/24 | 20:31 | TTV |
| R03 | 2015/11/24 | 21:30 | PTS |
| R04 | 2015/11/24 | 21:40 | CTV |
| R05 | 2015/11/24 | 21:45 | TTV |
| R06 | 2015/11/25 | 19:48 | CTS |
| R07 | 2015/11/25 | 20:32 | TTV |
| R08 | 2015/11/25 | 21:29 | FTV |
| R09 | 2015/11/25 | 21:40 | CTV |
| R10 | 2015/11/25 | 21:45 | TTV |
| R11 | 2015/11/25 | 22:10 | HBX |
| R12 | 2015/11/26 | 19:50 | CTS |
| R13 | 2015/11/26 | 20:30 | TTV |
| R14 | 2015/11/26 | 21:30 | PTS |
| R15 | 2015/11/26 | 21:50 | CTV |
| R16 | 2015/11/26 | 22:02 | TTV |

300b sort →

| | C1 | C2 | C3 |
|---|---|---|---|
| R02 | 2015/11/24 | 20:31 | TTV |
| R05 | 2015/11/24 | 21:45 | TTV |
| R07 | 2015/11/25 | 20:32 | TTV |
| R10 | 2015/11/25 | 21:45 | TTV |
| R13 | 2015/11/26 | 20:30 | TTV |
| R16 | 2015/11/26 | 22:02 | TTV |
| R01 | 2015/11/24 | 19:50 | CTS |
| R06 | 2015/11/25 | 19:48 | CTS |
| R12 | 2015/11/26 | 19:50 | CTS |
| R04 | 2015/11/24 | 21:40 | CTV |
| R09 | 2015/11/25 | 21:40 | CTV |
| R15 | 2015/11/26 | 21:50 | CTV |
| R03 | 2015/11/24 | 21:30 | PTS |
| R14 | 2015/11/26 | 21:30 | PTS |
| R08 | 2015/11/25 | 21:29 | FTV |
| R11 | 2015/11/25 | 22:10 | HBX |

VIEWING RECORD PROCESSING CIRCUIT AND ASSOCIATED METHOD

This application claims the benefit of Taiwan application Serial No. 105108858, filed Mar. 22, 2016, the subject matter of which is incorporated herein by reference.

BACKGROUND OF THE INVENTION

Field of the Invention

The invention relates in general to a viewing record processing circuit and an associated method, and more particularly to a viewing record processing circuit that may be disposed in a playback device to reduce an uploading bandwidth of viewing records and an associated method.

Description of the Related Art

A playback device (such as a television, a projector, a set-top box (STB), and a helmet virtual reality player) is capable of playing various types of multimedia programs provided by different content providers (e.g., cable television stations, cable-less television stations and audiovisual streaming websites), and is thus an indispensible part of the modern information lifestyle.

SUMMARY OF THE INVENTION

Compiling statistics of audience viewing rates allows content providers to understand audience viewing habits, comments and preferences, according to which program contents and audiovisual service quality may be improved. To accurately compile statistics of viewing rates, viewing conditions of audiences may be recorded at playback devices at client ends (audiences) and be uploaded to viewing statistics server. However, due to the prevalence of playback devices, the total number of playback devices is immense, and so the viewing records of these playback devices also need a huge bandwidth in order to be uploaded to a server. To reduce the bandwidth needed for uploading to the server, the present invention first appropriately processes viewing records at a playback device, so as to perform optimized compression according to the characteristics of the viewing records.

It is an object of the present invention to provide a viewing record processing circuit that may be disposed in a playback device. The viewing record processing circuit includes a sensor, a decoder, an instruction module, a viewing list generating module, a sorting module and a compression module. The sensor receives a remote control signal sent from a remote controller. The decoder decodes the remote control signal to a digital command code. The instruction module generates a plurality of channel selection instructions according to the digital command code. The viewing list generating module generates a viewing list according to the channel selection signals. The viewing list includes a plurality of viewing records. The sorting module sorts the plurality of viewing records in the viewing list to generate a sorted viewing list. The compression module compresses the sorted viewing list to generate a compressed viewing list.

It is another object of the present invention to provide a method for processing viewing records. The method includes operations performed by the above viewing record processing circuit.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
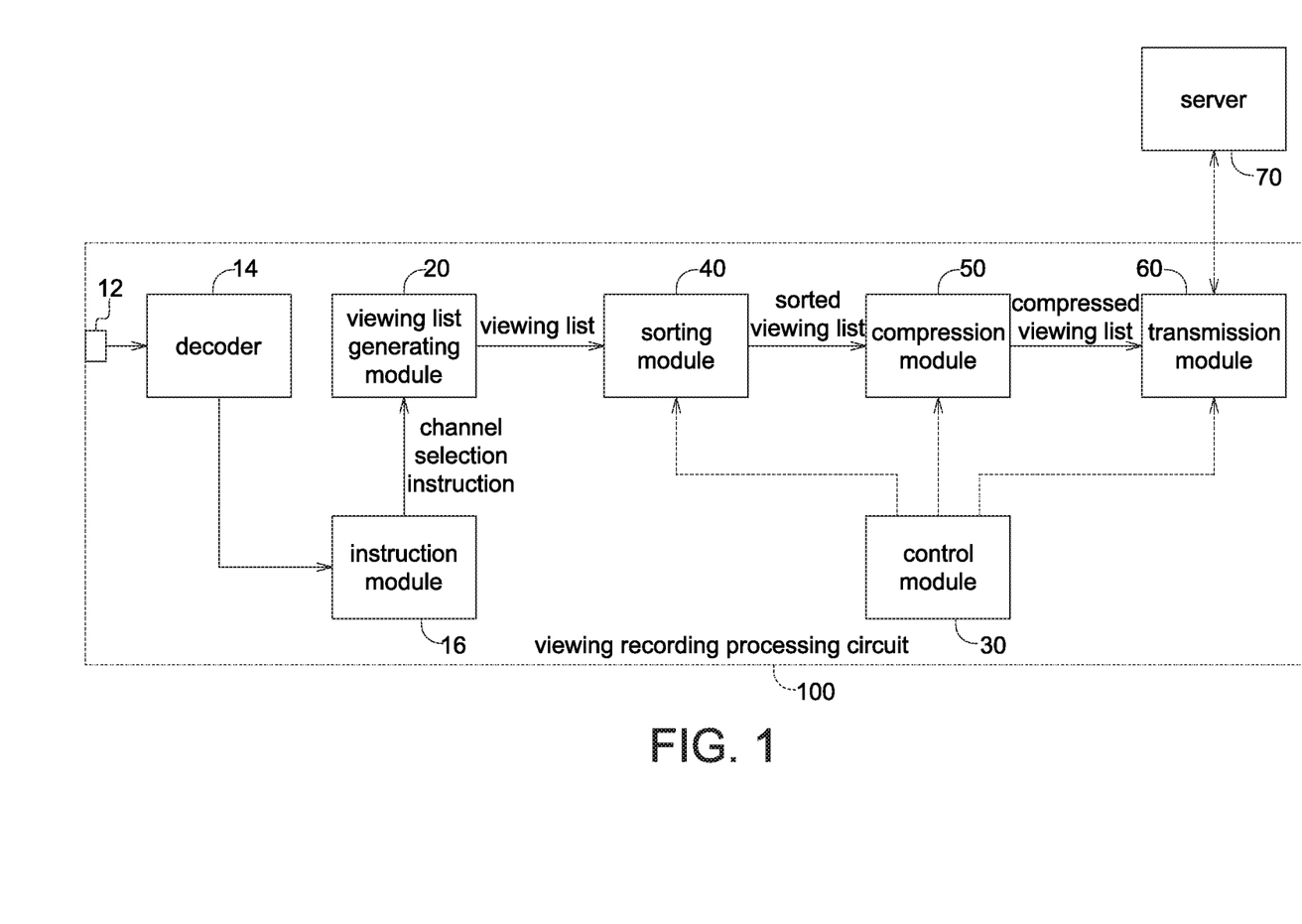
FIG. 1 is a viewing record processing circuit according to an embodiment of the present invention.
Figure 2:
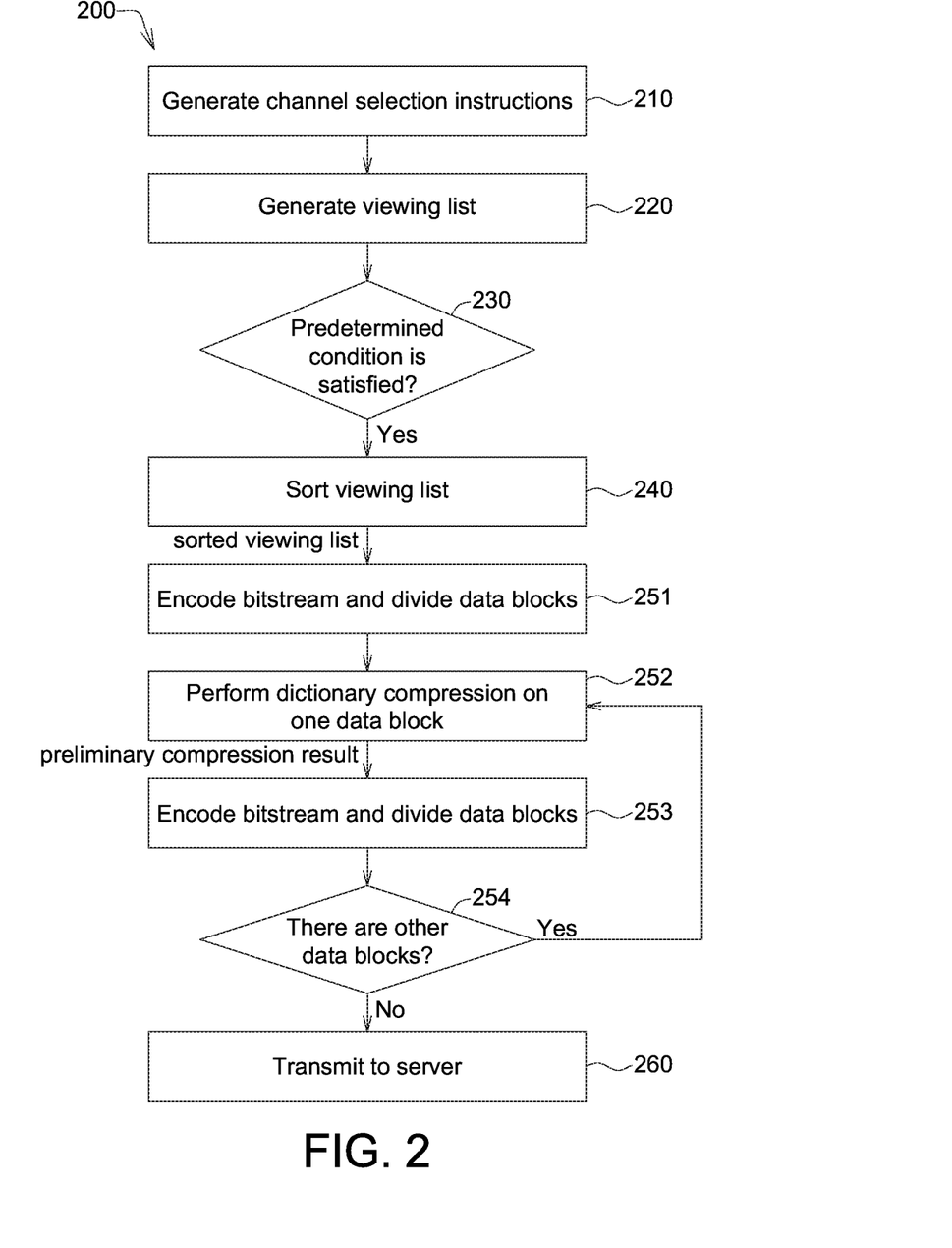
FIG. 2 is a process according to an embodiment of the present invention.

FIG. 1 shows a block diagram of a viewing record processing circuit 100 according to an embodiment of the present invention. Referring to FIG. 1, the viewing record processing circuit 100 includes a sensor 12, a decoder 14, an instruction module 16, a viewing list generating module 20, a control module 30, a sorting module 40, a compression module 50 and a transmission module 60. The viewing record processing circuit 100 may be disposed in a playback device (not shown), such as a television or a set-top box (STB). The playback device receives remote control from a remote controller (not shown). FIG. 2 shows a flowchart of a process 200 according to an embodiment of the present invention. The process 200 includes following steps, which are performed by the viewing record processing circuit 100 and are described in detail below.

In step 210, the sensor 12 receives a remote control signal sent from the remote controller, the decoder 14 decodes the remote control signal to generate a digital command code, and the instruction module 16 generates a corresponding viewing channel selection instruction according to the digital command code. For example, the remote controller may be provided with a plurality of physical or virtual keys (not shown), each of which corresponding to one digital command code. When a user (a viewer) presses a key of the remote controller (e.g., consecutively pressing the keys "1" and "9"), the remote controller modulates the digital command code into an infrared (or electronic or magnetic waves) remote signal, which is then sent to the playback device and received by the sensor 12. The decoder 14 decodes the received remote control signal to a digital command code. The instruction module 16 may access the digital command code decoded by the decoder 14, and learn the keys (e.g., the keys "1" and "9") that the user presses. If the key that the user presses is associated with a viewing channel (e.g., the number "19" combined from "1" and "9" corresponds to a viewing channel TTV), the instruction module 16 generates a viewing channel selection instruction to control a tuner (not shown) to switch to the viewing channel (e.g., TTV).

Figure 3A:
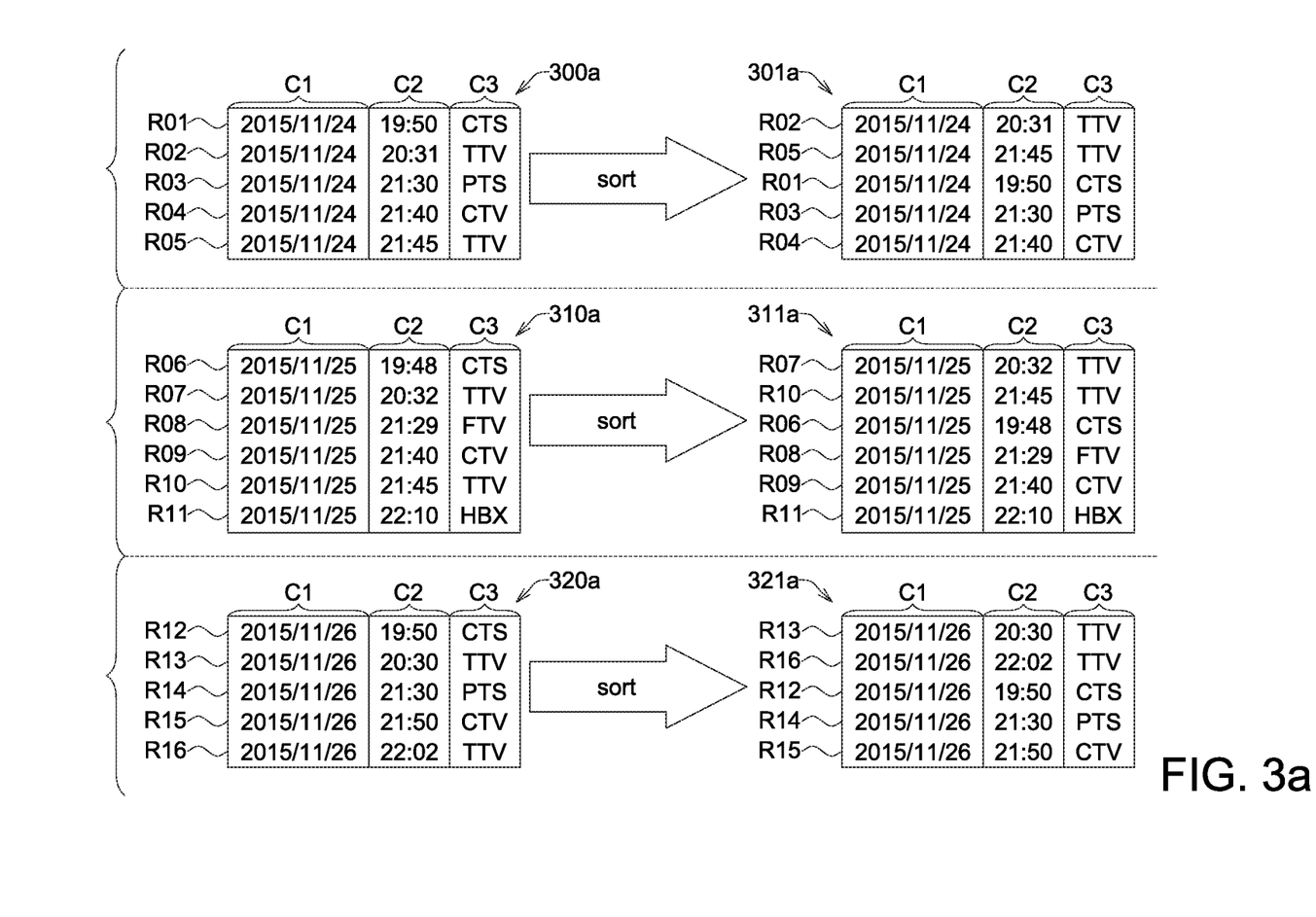
FIG. 3a and FIG. 3b are examples of steps of generating and sorting a view list in FIG. 2.

In step 220, the viewing list generating module 20 generates a viewing record according to the viewing channel selection instruction. For example, the viewing record includes a viewing date field, a viewing time field and a viewing channel field. Refer to FIG. 3a as well as FIG. 1 and FIG. 2. FIG. 3a shows examples of a plurality of viewing records R01 to R16, each of which including a viewing date field C1, a viewing time field C2, and a viewing channel field C3. For example, the viewing record R01 represents that, the user switches to a viewing channel CTS at 19:50 on Nov. 24, 2015. As the sensor 12 continues receiving different remote control signals of viewing channel switching, the instruction module 16 correspondingly generates a plurality of viewing channel selection instructions, and the viewing list generating module 20 also sequentially generates a plurality of viewing records and places the viewing records (e.g., the viewing record R01 and R02) into the viewing list according to a time sequence.

In step 230 and step 240, the control module 30 determines whether a predetermined condition is satisfied (step 230). If so, the control module 30 controls the sorting module 40 to sort the plurality of viewing records in the current viewing list to generate a sorted viewing list (step 240).

In one embodiment, the predetermined condition may be "the time has reached a predetermined time", e.g., "the time has reached 12:00 midnight". In other words, the viewing list has collected viewing records of 24 hours. When the predetermined condition is satisfied, the sorting module 40 sorts the viewing records in the viewing list according to the viewing channel (the field C3) to generate the sorted viewing list. Again referring to FIG. 3a, assuming that the viewing list includes the viewing records R01 to R05 (i.e., a viewing record 300a) when the time reaches 12:00 midnight on Nov. 24, 2015, the control module 30 controls the sorting module 40 to sort the viewing list 300a to generate a sorted viewing list 301a, such that viewing channels of at least two adjacent viewing records (e.g., R02 and R05) in the sorted viewing record 301a are identical. Further, assuming that the viewing list includes the viewing records R06 to R11 (i.e., the viewing record 310a) when the time reaches 12:00 midnight on Nov. 25, 2015, the control module 30 controls the sorting module 40 to sort the viewing list 310a to generate a sorted viewing list 311a, such that two viewing records that are originally not adjacent but indicate the same viewing channel (e.g., R07 and R10) may become adjacent after the sorting.

Figure 3B:
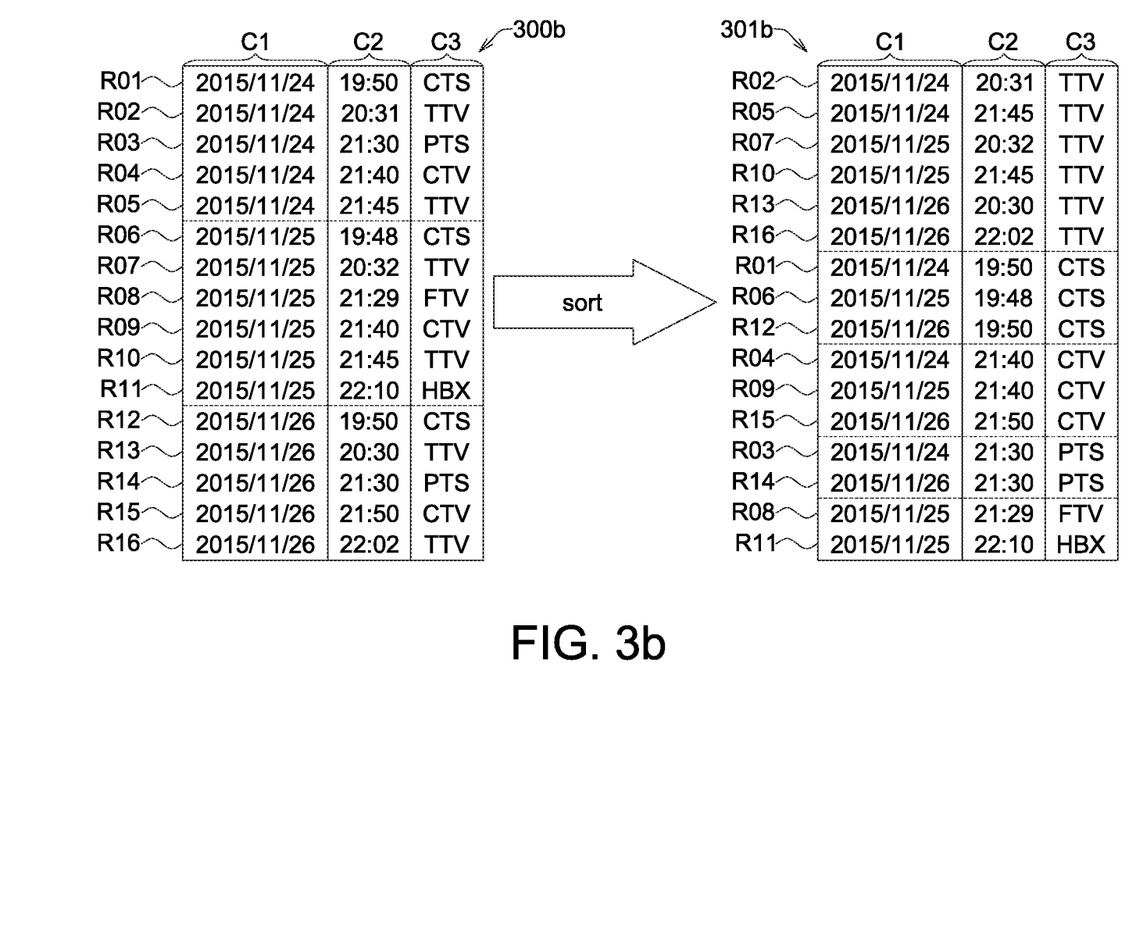

In another embodiment, the predetermined condition in step 230 may be "data size of the viewing list has reached a threshold". When the predetermined condition is satisfied, the control module 30 controls the sorting module 40 to first sort the viewing records in the viewing list according to the viewing channel (the field C3) and then to sort the viewing records in the viewing list according to the viewing date (the field C1) again. Referring to FIG. 3b, in this embodiment, the threshold is "16 viewing records". That is, when the control module 30 determines that the number of the viewing records in the viewing list reaches 16, e.g., the viewing records R01 to R16 (i.e., a viewing list 300b), the control module 30 controls the sorting module 40 to sort the viewing list 300b first according to the viewing channel and then according to the viewing date to generate a sorted viewing list 301b. Similar to the example in FIG. 3a, even if two viewing records (e.g., R02 and R05) are originally not adjacent to each other due to different viewing times, these two viewing records may become adjacent because of the same viewing channel after the sorting. Further, it can be also seen from the example in FIG. 3b that, even if two viewing records (e.g., R05 and R07, or R10 and R13) are originally not adjacent to each other due to different viewing dates, these two viewing records may become adjacent after the sorting because of the same viewing channel. Further, besides according to the viewing channel, the viewing list 300b is also sorted according to the viewing date. Thus, even if two viewing records (e.g., R08 and R11) are originally not adjacent to each other due to different viewing times and different viewing channels, these two viewing records may become adjacent to each other because of the same viewing date after the sorting.

In step 251, the compression module 50 encodes the sorted viewing list (e.g., 301a, 311a and 321a in FIG. 3a, or 301b in FIG. 3b) into a binary bitstream, just as alphabets, punctuations and numbers in a text file may be coded into a binary bitstream according to American Standard Code for Information Interchange (ASCII) or Unicode. The compression module 50 then divides the bitstream into one or multiple data blocks. Each data block includes multiple adjacent viewing records in the sorted viewing list, and is described by a plurality of symbols. For example, each symbol is an 8-bit or 16-bit word. In one embodiment, the compression module 50 divides the bitstream according to a fixed data size, in a way that the data sizes of the data blocks are equal (i.e., including the same number of symbols). For example, every four adjacent viewing records are allocated into the same data block. In another embodiment, the compression module 50 may adaptively divide the bitstream according to the sorting result of step 240, such that the viewing records having the same viewing channel are allocated in the same data block. Taking FIG. 3b for example, the viewing records R02, R05, R07, R10, R13 and R16 having the same viewing channel "TTV" are allocated in the same data block; the viewing records R01, R06 and R12 having the same viewing channel "CTS" are allocated in another data block.

Figure 4:
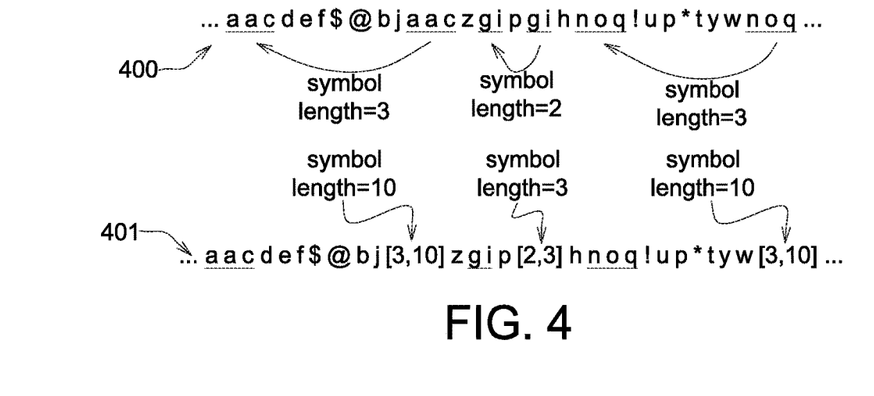
FIG. 4 is an example of dictionary compression in FIG. 2.

In step 252, the compression module 50 performs a dictionary compression on one data block. When performing dictionary compression, according to a determination result indicating that first multiple consecutive symbols (a first part) and subsequent multiple consecutive symbols (a second part) have the same contents in a read data block, the compression module 50 replaces the subsequent multiple consecutive symbols by compression information to form a preliminary compression result, wherein multiple consecutive symbols occurring repeatedly are referred to dictionary symbols. FIG. 4 shows a schematic diagram of a data block 400 and a preliminary compression result 401. The data block 400 may include adjacent viewing records R13, R16, R01 and R06 in the sorted viewing list 301b. In the data block 400, the symbol "aac" describes the viewing channel of the viewing records R13 and R16 "TTV", the symbol "noq" describes the viewing channel of the viewing records R01 and R06 "CTS", the symbol s "def$@bj", "zgipgih" and "!up*tyw" describe the viewing dates and viewing times of the viewing records R16, R01 and R06, respectively. Because the subsequent symbol "aac" representing the viewing record R16 is the same as the previous symbol "aac" representing the viewing channel of the viewing record R13, the next symbol "aac" representing the viewing channel of the viewing record R16 may be replaced by compression information [3, 10], as shown by the preliminary compression result 401. The compression information [3, 10] includes a symbol length "3" and a symbol shift "10"—the symbol length "3" represents the number of identical symbols, and the symbol shift "10" represents the number of symbols between the two sets of symbols "aac". Similarly, as the symbol "gi" repeatedly occurs, the subsequent symbol "gi" may be replaced by compression information [2, 3]. Similarly, because the symbol "noq" repeatedly occurs, the subsequent symbol "noq" may be replaced by compression information [3, 10], as shown by the preliminary compression result 401.

Figure 5:
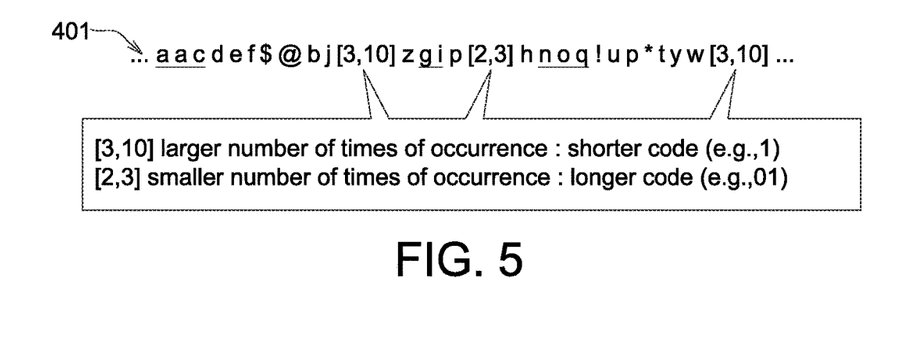
FIG. 5 is an example of entropy compression in FIG. 2.

In step 253, the compression module 50 further performs entropy compression, e.g., Huffman coding and/or Shannon- Fano coding, on the preliminary compression result. The entropy compression may include: comparing the number of times of occurrence of a first segment in the preliminary compression result with the number of times of occurrence of a second segment in the preliminary compression result, replacing the first segment by a shorter code, and replacing the second segment by a longer code to accordingly form a compressed viewing list. In continuation of the example in FIG. 4, refer to FIG. 5 showing conditions of performing entropy compression on the preliminary compression result 401 in FIG. 4. In the preliminary compression result 401, as the number of times of occurrence of the compression information [3, 10] is greater than the number of times of occurrence of the compression information [2, 3], the compression information [3, 10] may be replaced by a shorter code (e.g., one bit "1"), and the compression information [2, 3] may be replaced by a longer code (e.g., two bits "01").

In step 254 and step 260, the control module 30 determines whether there are other data blocks not yet compressed (step 254), and controls the compression module 50 to perform dictionary compression and entropy compression on another data block (iterating step 252) when there are other data blocks not yet compressed. When all of the data blocks are compressed, the control module 30 controls the transmission module 60 to upload the compressed viewing list to a remote server 70 (step 260) via a wired or wireless network. In addition to the compressed viewing list, the transmission module 60 may also transmit an identity code that is unique to the playback device in which the viewing record processing circuit 100 is located, such that the server 70 may identify different compression viewing lists transmitted from different playback devices to provide more sophisticated viewing rate statistics. For example, given that the server may identify the geographic regions where different playback devices are located using the identity codes, statistics of viewing rates for different regions may be compiled for these different regions, so that content providers of the different regions may improve program contents and arrangements to suit audience preferences of individual regions.

In the present invention, since the viewing records in the viewing list are first sorted (step 240) before the viewing records are compressed (steps 251 to 254), the compression rate may be optimized to provide a smaller data size of the compressed viewing list and hence a smaller uploading bandwidth. In comparison, the data size of the compressed viewing list obtained from compressing an unsorted viewing list is larger, and a larger uploading bandwidth is occupied. One reason is that, the sorting step 240 effectively arranges the viewing records having the same fields in a centralized manner, such that the dictionary compression in step 252 may obtain more subsequent symbols matching the dictionary symbols through comparison. Sorting is not performed for a common document, as it may disrupt the original structure and order of the document. However, the present invention performs sorting based on the characteristics of a viewing list in a unit of viewing records, and so the information in the viewing records is kept intact although orders of the viewing records in the viewing list may be changed. After the server 70 receives the compressed viewing list, sorting may be again performed according to the viewing date and the viewing time if needed to obtain an unsorted viewing list. Each of the viewing records may include other fields, such as program ratings that a user gives on the viewing channel or whether a user likes the programs of the viewing channel.

In FIG. 1, the instruction module 16, the viewing list generating module 20, the control module 30, the sorting module 40, the compression module 50 and the transmission module 60 may be realized through executing software or firmware by a processor. The decoder 14 may be integrated in the processor, or may be provided in another microprocessor chip different from the processor.

To collect viewing lists of a vast number of playback devices, a hierarchical server structure may be adopted. For example, the hierarchical server structure may include a plurality of first-hierarchy servers and a second-hierarchy server. Each of the first-hierarchy servers receives compressed viewing lists uploaded by a plurality of nearby playback devices, decompressed these compressed viewing lists, and integrates the decompressed viewing lists into a regional viewing list. Further, each of the first-hierarchy servers may realize the sorting module 40 and the compression module 50 in FIG. 1 to sort (step 240) and compress (steps 251 to 254) the regional viewing list to accordingly generate a compressed regional viewing list that is then uploaded to the second-hierarchy server. When the first-hierarchy servers perform sorting of step 240, the viewing records that are originally from different playback devices and are not adjacent may become adjacently arranged because of the same viewing channel (the field C3). The second-hierarchy server receives the compressed region viewing lists uploaded by the plurality of first-hierarchy servers, and performs decompression and compiles inter-regional viewing rate statistics. The hierarchical server structure saves costs for collecting the viewing lists. Due to larger bandwidth and higher operation costs of the first-hierarchy servers, the first-hierarchy servers are used to collect and compress regional viewing lists in small numbers. In comparison, the second-hierarchy server has a smaller bandwidth and lower operations costs, and is thus suitable for collecting and compiling statistics of inter-regional viewing lists in large numbers.

In conclusion, the process of optimizing viewing lists according to characteristics of the viewing lists of the present invention, as opposed to pure document compression, is capable of more effectively reducing the bandwidth for uploading the viewing lists to further save costs for compiling statistics of viewing rates, which is beneficial to both users (audiences) and content providers.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A viewing record processing circuit, comprising:
a sensor, for receiving a remote control signal;
a decoder, coupled to the sensor for decoding the remote control signal to generate a digital command code;
an instruction module, coupled to the decoder for receiving the digital command code and for generating a plurality of channel selection instructions according to the digital command code;
a viewing list generating module, for generating a viewing list according to the channel selection instructions, the viewing list comprising a plurality of viewing records;

a sorting module, for sorting the plurality of viewing records in the viewing list to generate a sorted viewing list; and a compression module, for compressing the sorted viewing list to generate a compressed viewing list, comprising:

dividing the sorted viewing list into at least one data block, each of which comprising a partial number of adjacent viewing records in the sorted viewing list and described by a plurality of symbols;

reading one of the data blocks; and according to a determination result indicating that a first part and a second part of the read data block have identical contents, replacing the second part by compression information to form a preliminary compression result;

wherein, the compression information comprises a symbol length and a symbol shift, the symbol length is associated with the number of symbols in the first part, and the symbol shift is associated with the number of symbols between the first part and the second part.

2. The viewing record processing circuit according to claim 1, wherein each of the viewing records comprises a plurality of fields that comprise a first field, and the sorting module sorts the viewing records according to the first field in the viewing list to generate the sorted viewing list, in a way that the first fields of at least two adjacent viewing records in the sorted viewing list are identical.

3. The viewing record processing circuit according to claim 2, wherein the first field is a viewing channel.

4. The viewing record processing circuit according to claim 1, wherein each of the viewing records comprises a plurality of fields that comprise a first field and a second field, the sorting module sorts the viewing records in the viewing list according to the first field and the second field, in a way that the first field and the second field of at least two adjacent viewing records in the sorted viewing list are identical.

5. The viewing record processing circuit according to claim 4, wherein the first field is a viewing channel, and the second field is a viewing date.

6. The viewing record processing circuit according to claim 1, wherein the operation of the compression module compressing the sorted viewing list to generate the compressed viewing list further comprises:

comparing the number of times of occurrence of a first segment with the number of times of occurrence of a second segment in the preliminary compression result; and according to a comparison result indicating that the number of times of occurrence of the first segment is greater than the number of times of occurrence of the second segment, replacing the first segment by a shorter code and replacing the second segment by a longer code to generate the compressed viewing list.

7. The viewing record processing circuit according to claim 1, further comprising:

a control module, determining according to a predetermined condition whether the compression module is to start compressing the sorted viewing list.

8. The viewing record processing circuit according to claim 7, wherein the predetermined condition is a data size of the viewing list reaching a threshold or a predetermined time being reached.

9. The viewing record processing circuit according to claim 1, wherein each of the channel selection instructions is associated with one viewing channel, and the viewing list generating module generates the viewing records according to time points at which the channel selection instructions are generated and the viewing channels associated with the channel selection instructions, respectively.

10. A viewing record processing method performed by a circuit, the method comprising:

receiving a remote control signal by a sensor;

decoding the remote control signal from the sensor to generate a digital command code by a decoder;

generating a plurality of channel selection instructions according to the digital command code by an instruction module;

generating a viewing list according to the channel selection instructions by a viewing list generating module, wherein the viewing list comprises a plurality of viewing records;

sorting the plurality of viewing records in the viewing list to generate a sorted viewing list by a sorting module; and compressing the sorted viewing list to generate a compressed viewing list by a compression module, comprising:

dividing the sorted viewing list into at least one data block, each of which comprising a partial number of adjacent viewing records in the sorted viewing list and described by a plurality of symbols;

reading one of the data blocks; and according to a determination result indicating that a first part and a second part of the read data block have identical contents, replacing the second part by compression information to form a preliminary compression result;

wherein, the compression information comprises a symbol length and a symbol shift, the symbol length is associated with the number of symbols in the first part, and the symbol shift is associated with the number of symbols between the first part and the second part.

11. The viewing record processing method according to claim 10, wherein each of the viewing records comprises a plurality of fields that comprise a first field, and the step of sorting the viewing records in the viewing list to generate the sorted viewing list is sorting the viewing records in the viewing list according to the first field to generate the sorted viewing list, in a way that the first fields of at least two adjacent viewing records in the sorted viewing list are identical.

12. The viewing record processing method according to claim 11, wherein the first field is a viewing channel.

13. The viewing record processing method according to claim 10, wherein each of the viewing records comprises a plurality of fields that comprise a first field and a second field, and the step of sorting the viewing records in the viewing list to generate the sorted viewing list is sorting the viewing records in the viewing list according to the first field and the second field, in a way that the first field and the second field of at least two adjacent viewing records in the sorted viewing list are identical.

14. The viewing record processing method according to claim 13, wherein the first field is a viewing channel, and the second field is a viewing date.

15. The viewing record processing method according to claim 10, wherein the step of compressing the sorted viewing list to generate the compressed viewing list further comprises:

comparing the number of times of occurrence of a first segment with the number of times of occurrence of a second segment in the preliminary compression result; and according to a comparison result indicating that the number of times of occurrence of the first segment is greater than the number of times of occurrence of the second segment, replacing the first segment by a shorter code and replacing the second segment by a longer code to generate the compressed viewing list.

16. The viewing record processing method according to claim 10, further comprising:
determining according to a predetermined condition whether to start compressing the sorted viewing list.

17. The viewing record processing method according to claim 16, wherein the predetermined condition is a data size of the viewing list reaching a threshold or a predetermined time being reached.

18. The viewing record processing method according to claim 10, wherein each of the channel selection instructions is associated with one viewing channel, and the step of generating the viewing list according to the channel selection instructions comprises generating the viewing records according to time points at which the channel selection instructions are generated and the viewing channels associated with the channel selection instructions, respectively.

* * * * *